Figure 4:
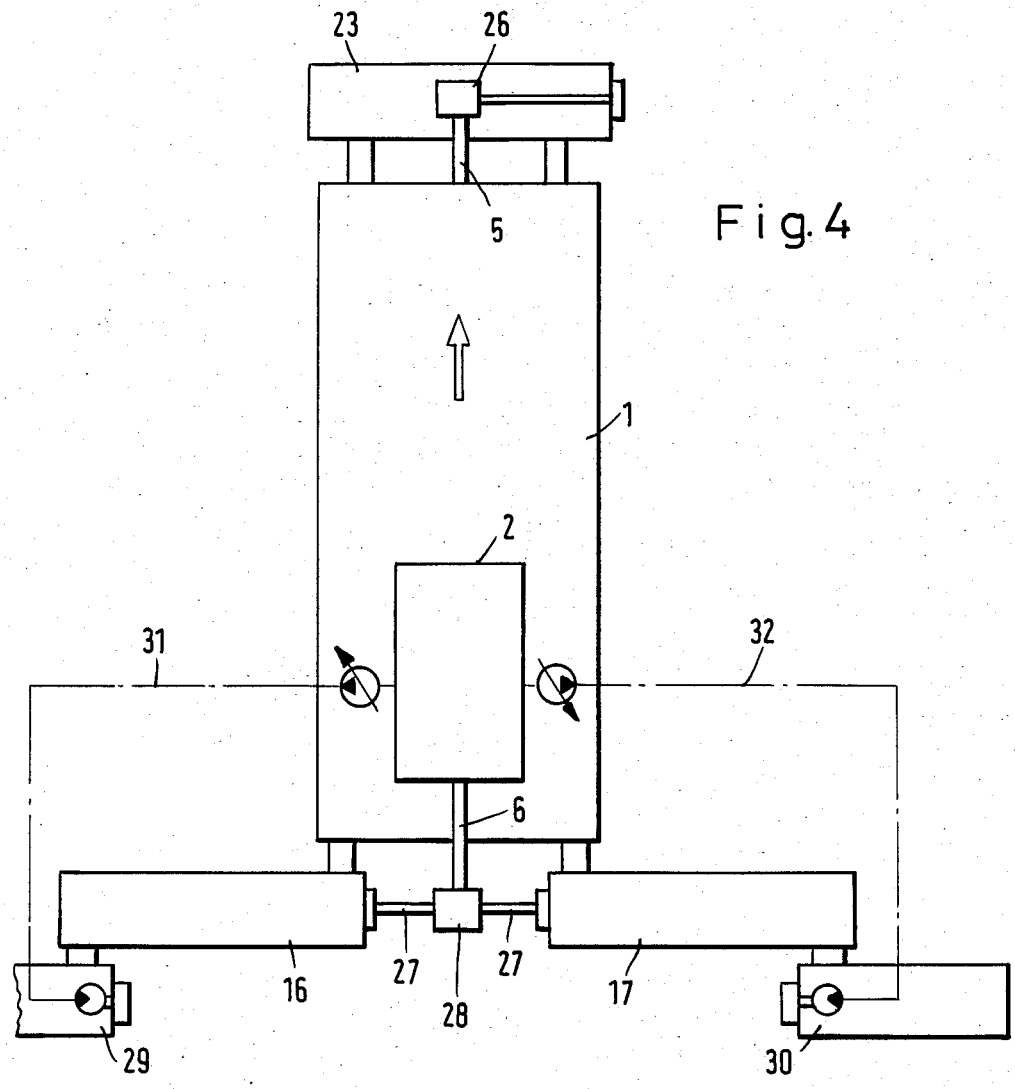

United States Patent [19]

Doyen et al.

[11] Patent Number: 4,632,200
[45] Date of Patent: Dec. 30, 1986

[54] DRIVE SYSTEM ON A CARRIER VEHICLE FOR VARIOUS IMPLEMENTS ATTACHED ON THE FRONT OR REAR

[75] Inventors: Hans-Henning Doyen, Neustadt-Konigsbach; Edgar Hühn, Mörfelden-Walldorf, both of Fed. Rep. of Germany

[73] Assignees: Ing. Alfred Schmidt GmbH, Balsien; Flughafen Frankfurt/Main AG, Frankfurt am Main, both of Fed. Rep. of Germany

[21] Appl. No.: 681,093

[22] Filed: Dec. 13, 1984

[30] Foreign Application Priority Data

Dec. 13, 1983 [DE] Fed. Rep. of Germany ....... 3344987

[51] Int. Cl.$^4$ ............................................. B60K 25/02
[52] U.S. Cl. ................... 180/53.7; 180/53.1; 180/69.6
[58] Field of Search ............ 180/53.1, 53.7, 69.6; 56/10.6, 10.7, 13.5, 14.7

[56] References Cited

U.S. PATENT DOCUMENTS

| | | | |
|---|---|---|---|
| 2,408,857 | 10/1946 | James | 37/240 |
| 2,689,621 | 9/1954 | Donley | 180/69.6 |
| 2,920,434 | 1/1960 | Ingram | 56/10.6 |
| 3,224,176 | 12/1965 | Taylor | 56/7 |
| 3,548,951 | 12/1970 | Weasel, Jr. et al. | 56/10.7 |
| 4,277,080 | 7/1981 | Smith et al. | 180/53.1 |

FOREIGN PATENT DOCUMENTS

| | | | |
|---|---|---|---|
| 1255151 | 1/1961 | France . | |
| 98936 | 11/1961 | Norway | 180/53.7 |
| 304581 | 3/1955 | Switzerland | 180/53.7 |
| 902170 | 7/1962 | United Kingdom | 180/53.7 |

Primary Examiner—John J. Love
Assistant Examiner—Kenneth R. Rice

[57] ABSTRACT

With a drive system upon a carrier vehicle for various front or rear machine attachments for landscape maintenance in summer as well as for winter service, the carrier vehicle 1 possesses, for the powering of high performance machine units, in addition to the vehicle motor an auxiliary motor 2, which is fitted with a universal joint drive shaft 10 located under the floor for the powering of front-attached snow removal machines. The vehicle motor features at least one front power takeoff shaft 5, which is designed for the summer operation of a front mowing unit 23. The auxiliary motor 2 has in addition a rear-located universal joint drive shaft 6 for the operation of a rear-attached mowing apparatus 11 of wide cut, which comprises several separate mowing units.

6 Claims, 4 Drawing Figures

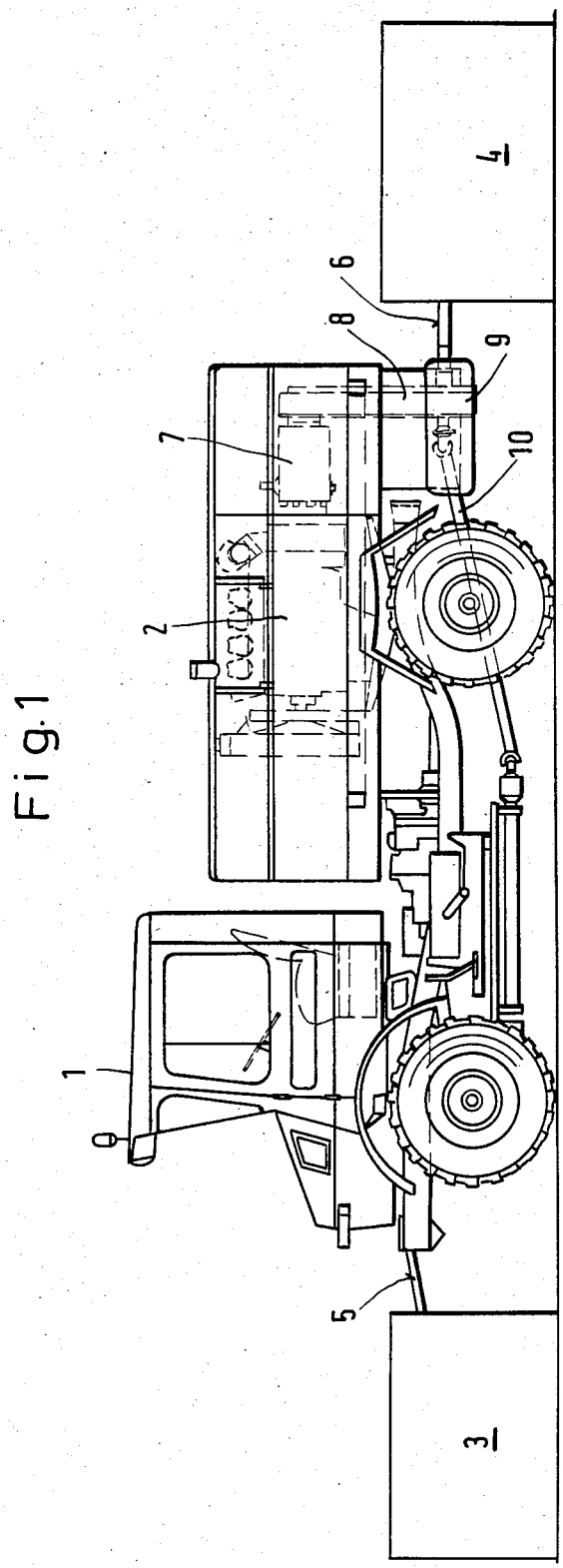

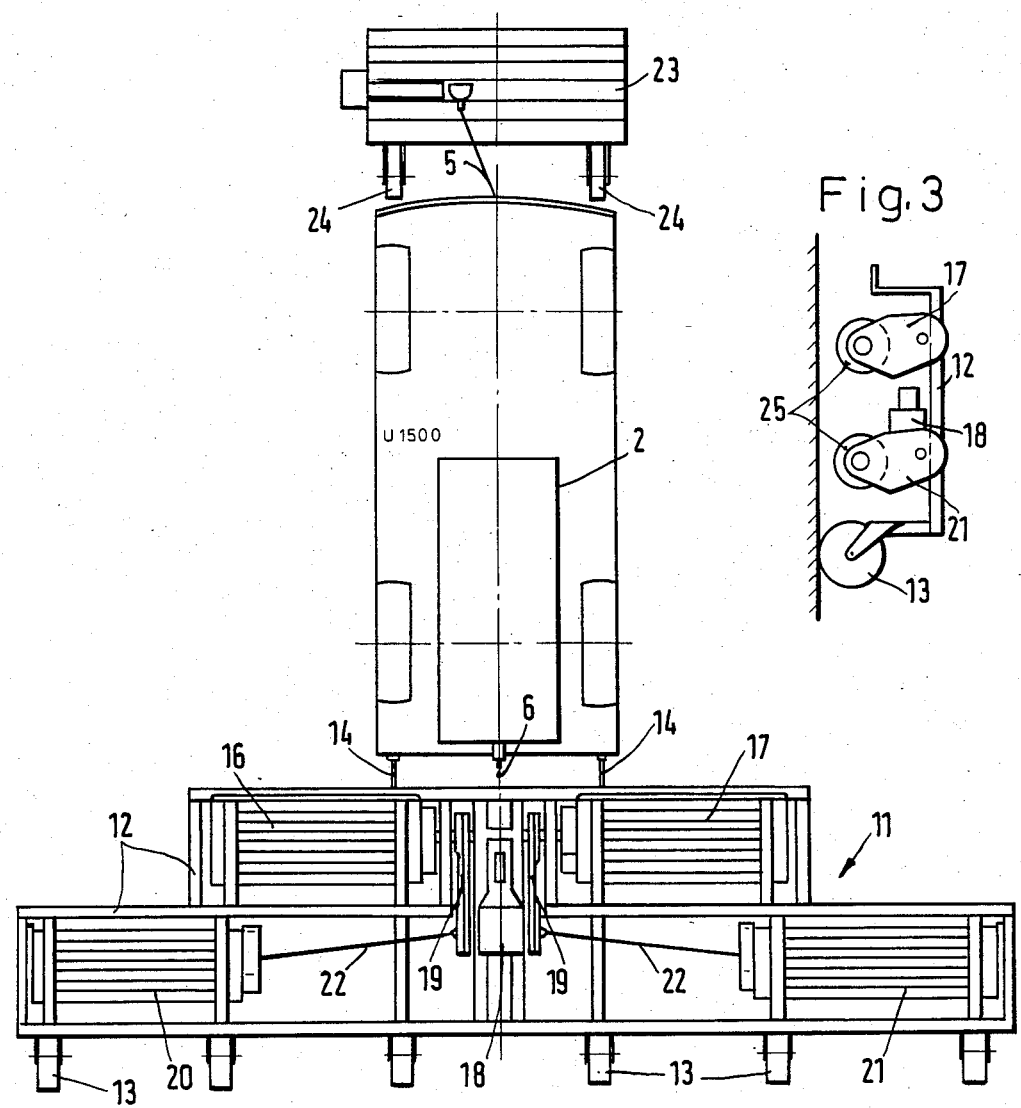

DRIVE SYSTEM ON A CARRIER VEHICLE FOR VARIOUS IMPLEMENTS ATTACHED ON THE FRONT OR REAR

The invention relates to a drive system aboard a carrier vehicle for various implements attached front or rear, for landscape maintenance in the summer as well as winter service, by which arrangement the carrier vehicle, besides its own motor, is equipped with an auxiliary motor for the powering of high-performance machine units, which motor is equipped with a front drive connection for the powering of a snow-removal machine attached at the front.

Such drive systems are common. They are, however, used mainly in winter service, since an auxiliary motor is not required for the operation of of attachments used during the summer. During the summer, the auxiliary motor of the carrier vehicle was often replaced by a platform bed.

Because of the realization that, in the mowing of large grass areas in airports quick coverage of large areas is important economically, the present invention is based upon the problem of devising a drive system which is especially suited on the one hand for the operation of high-performance machines for use in summer mowing, and on the other hand for snow removal operations during the winter. In order to be able to mow approx. 7 hectares per hour at airports, two spiral-bladed mowers each having a cutting width of 4 m were run one in front of the other. Following in the path of these was a rotary-type mower of approximately double the cutting width.

In addition, large-area mowers are common. These comprise a front-attached, laterally-fixed mowing apparatus and a mowing apparatus pulled behind the rear of the carrier vehicle.

A system in accordance with the invention which is capable of solving the already mentioned problem, and which is superior to conventional machines with regard to cutting width and speed, involves for the summer operation of the carrier vehicle the employment of either the vehicle motor or the auxiliary motor to power a front-mowing unit by means of the drive connection at the front, and in which the auxiliary motor is further designed with a rear drive connection for the operation of a rear-attached mowing apparatus comprising several separate mowing units. Moreover, the vehicle motor can have a power takeoff shaft located at the front while the rear drive connection can be a universal joint driveshaft. For the front drive connection, an under-floor universal joint driveshaft may be planned.

According to this suggestion, it is possible, with an auxiliary motor of suitable dimensions, and with an operating width of approx. 9 m and at a speed of between 8 and 10 km/hr, to cover an area of between 8 and 10 hectares. The power output of auxiliary motor and vehicle motor together is 400 KW. The primary advantage of this drive system is that in winter service, the auxiliary motor is in any event necessary for the operation of high-performance snow removal machines. This applies particularly in the maintenance of airfields, where most often several machines of this type may be found. According to the theory underlying the present invention, the drive system required for snow removal operations, that is, the carrier vehicle with auxiliary motor, may henceforth be utilised during the summer in the mowing of large areas. Besides the under-floor universal joint drive shaft, the system merely requires a front-located power takeoff shaft for the vehicle motor and a rear-located universal joint drive shaft for the auxiliary motor. In this manner, the required mowing units attached front and rear to the carrier vehicle may be operated.

It has been demonstrated that the output requirement for the front-located mowing unit is only 1/7 to 1/5 of the output requirement of a mowing device located at the rear, if the latter comprises at least two pairs of laterally staggered mowing units. In this manner it is possible for the drive system according to the invention, which comprises a carrier vehicle with auxiliary motor, to be used to capacity throughout the year. In such a case, it is conceivable to have two to five cuttings during summer operations, given respect to the height of the grass and the weather patterns. Because of its great output capability, the drive system according to the invention is especially suited to the operation of high performance flail-type mulchers, which enable the grass to be cut to any desired height and which mince the cuttings so finely that they are distributed evenly, i.e. without leaving tracks. The operational widths of such flail-type mulchers lie between 1,75 m and 2,50 m. Their operating RPM is over 2000.

The powering and attachment of the rear-located mowing apparatus can be effected in different ways, e.g., the rear-located mowing units may be driven by means of a common power distributor, for instance a gearbox. In one effective form of the design, the mowing apparatus is driven solely by the rear-located universal joint drive shaft of the auxiliary motor, which is connected to a power distributor, from which a first pair of rear-located mowing units is powered by a belt drive and a second pair by lateral universal joint drive shafts. In a further variation, a first pair of rear-located mowing units is powered by means of the rear-located universal joint drive shaft of the auxiliary motor, while the second pair is driven by means of the hydraulic system powered by the auxiliary motor. In an especially advantageous design form of the invention, the first pair of rear-located mowing units is, viewed in the direction of mowing, located forward of, and at least partly on the inside of, the second pair, wherein all rear-located mowing units are attached upon a common apparatus frame, which is supported atop wheels, whose height is adjustable, and which is pulled by the carrier vehicle. Suitable carrier vehicles have motors producing approx. 130 KW. For the operation of a front-mounted flail-type mulcher, the vehicle motor produces approx. 70 KW which is transmitted by the front-located power takeoff shaft. Within the scope of the invention, each of the rear or front drive connections may be in the form of a hydraulic drive.

In the following, the drive system according to the invention is explained as per the illustration. Shown are FIG. 1 a carrier vehicle shown from the side, FIG. 2 a top view of the carrier vehicle with front mowing unit and rear-located mowing apparatus, FIG. 3 a side view of the rear-located mowing apparatus according to FIG. 2 and FIG. 4 a variation of the rear-located mowing apparatus, schematically represented.

FIG. 1 shows a carrier vehicle 1 with auxiliary motor 2. In the front of the vehicle is space 3 for the attachment of a front mowing unit, behind the vehicle a space 4 for a rear-located mowing apparatus, which is schematically represented. The front mowing unit is driven by means of a front-located power takeoff shaft 5 of the vehicle motor; the rear-located mowing apparatus is driven with the aid of a rear-located universal joint drive shaft 6 of the auxiliary motor 2. An upper gearblock 7 connected to the auxiliary motor 2 is connected by a V-belt 8 with a gearblock 9 situated under the floor. The output of the latter can be transmitted on the one hand to the rear-located universal joint drive shaft 6, and on the other hand to the-under-floor universal joint drive shaft 10, which at the front terminates more or less in the zone between the front wheels. The free end serves to power a snow removal machine mounted on the front, in which case the rear-located universal joint drive shaft 6 is unloaded, while during summer operation, the under-floor universal joint drive shaft 10 is not required and may therefore be disassembled.

In FIG. 2, the rear-located mowing apparatus 11 comprises two pairs of mowing units laterally staggered one behind the other, by which arrangement all mowing units are pulled upon a common frame 12, which is pulled on wheels 13 behind the rear of the vehicle, by which arrangement the frame is connected to the rear of the vehicle by means of two lateral trailer couplers 14. Each of a first pair of mowing units 16, 17, located directly behind the rear of the vehicle, is driven by a belt drive 19 aided by a power distributor 18. A second pair of exterior mowing units 20, 21, is driven by the power distributor 18 and lateral universal joint drive shafts 22. All mowing units are fixed to the frame, whose wheels 13 are height-adjustable, so that the desired cutting height may be obtained. The power distributor 18 is itself connected to the auxiliary motor by means of the rear-located universal joint drive shaft 6.

The front mowing unit 23 is powered by the vehicle motor by means of the front power takeoff shaft 5. It is attached to the vehicle in such a way that its height can be adjusted (not shown in greater detail) and is supported off the ground upon two rear wheels 24.

FIG. 3 shows in side perspective the rear mowing apparatus 11 with the frame 12, on which the corresponding mowing units 17, 21 are mounted. The power distributor 18 is recognizable between the mowing units, while on the underside of the mowing units can be seen the housing 25 of the flail-type mulchers.

FIG. 4 illustrates in schematic top view a variant of the drive system. The front mowing unit 23 is attached to the carrier vehicle 1 with auxiliary motor, the cutting width of the front mowing unit being somewhat greater than the width of the carrier vehicle 1. The front mowing unit 23 is driven by means of the front-located power takeoff shaft 5 and bi-directional gear 26. At the rear, on the carrier vehicle 1, are attached two additional pairs of mowing units which are arranged laterally in a staggered fashion. A first pair having two mowing units 16, 17 attached directly to the rear of the vehicle is driven by means of the rear-located universal joint drive shaft 6 of the auxiliary motor 2 and driveshafts 27 of a common gear 28. Both of these mowing units 16, 17 correspond in their cutting width roughly to the front mowing unit 23. The exterior pair of the rear-located mowing unit 29, 30, has a somewhat smaller cutting width than the mowing units 16, 17 running ahead, on whose housing are attached the exterior mowing units 29, 30. As a further attachment may be considered a rigid as well as a moveable combination in the form of an apparatus pulled on wheels. Both of the exterior rear-located mowing units 29, 30 are driven by means of the hydraulic circuits 31, 32 of the auxiliary motor 2. Concerning the distribution of output according to the design example given in FIG. 4, it may be assumed that the carrier vehicle itself has been designed with approx. 125 KW, the auxiliary motor with approx. 330 KW. Approx. 65 KW can be delivered across the power takeoff shaft of the carrier vehicle for the powering of the front mowing unit. The output requirement of the rear-located mowing units can be met without difficulty by the auxiliary motor 2; in such a case the latter transmits a portion of its output across the rear-located universal joint drive shaft 6, and another portion across the hydraulic circuits 31, 32. With respect to the cutting widths, it may be assumed from this example that the three larger mowing units 16, 1, 23 each have a cutting width of 2.50 m, while the smaller units feature a cutting width of 1.75 m. The cutting width of the entire system is barely 9 m.

We claim:

1. Drive system on a carrier vehicle for various front or rear attachments for landscape maintenance in summer as well as winter service, in which for powering said various attachments a carrier vehicle is provided with motor means comprising a vehicle motor and an auxiliary motor, one of said motors being a driving means for the powering of one of said attachments via a front drive connection, the improvement consisting in that for powering another of said attachments comprising first and second pairs of rear-located mowing units, the auxiliary motor by way of a rear drive connection to a power distributor powers respective drive connection means for powering said first and second pairs of rear-located mowing units, said vehicle motor and said auxiliary motor being adapted for concurrent operation.

2. Drive system according to claim 1, wherein said first pair and said second pair of said rear-located mowing units are powered by a belt-driven combination and lateral universal joint drive shafts, respectively.

3. Drive system according to claim 1, wherein said two pairs of rear-located mowing units are arranged in laterally staggered fashion.

4. Drive system according to any one of claims 1 to 3, wherein said first pair of rear-located mowing units is driven by means of a rear-located universal joint drive shaft of the auxiliary motor, and said second pair of rear-located mowing units is driven by means of a hydraulic circuit powered by the auxiliary motor.

5. Drive system according to claim 4, wherein the first pair of the rear-located mowing units, viewed in the direction of mowing, is situated in front of, and at least partly on the inside of the second pair, all said rear-located mowing units being attached to a common machine frame, whose height is adjustable upon wheels, and which is pulled by the carrier vehicle.

6. Drive system according to claim 1, wherein the power of the auxiliary motor is at least double the output of the vehicle motor.

* * * * *